United States Patent Office 3,195,921
Patented July 20, 1965

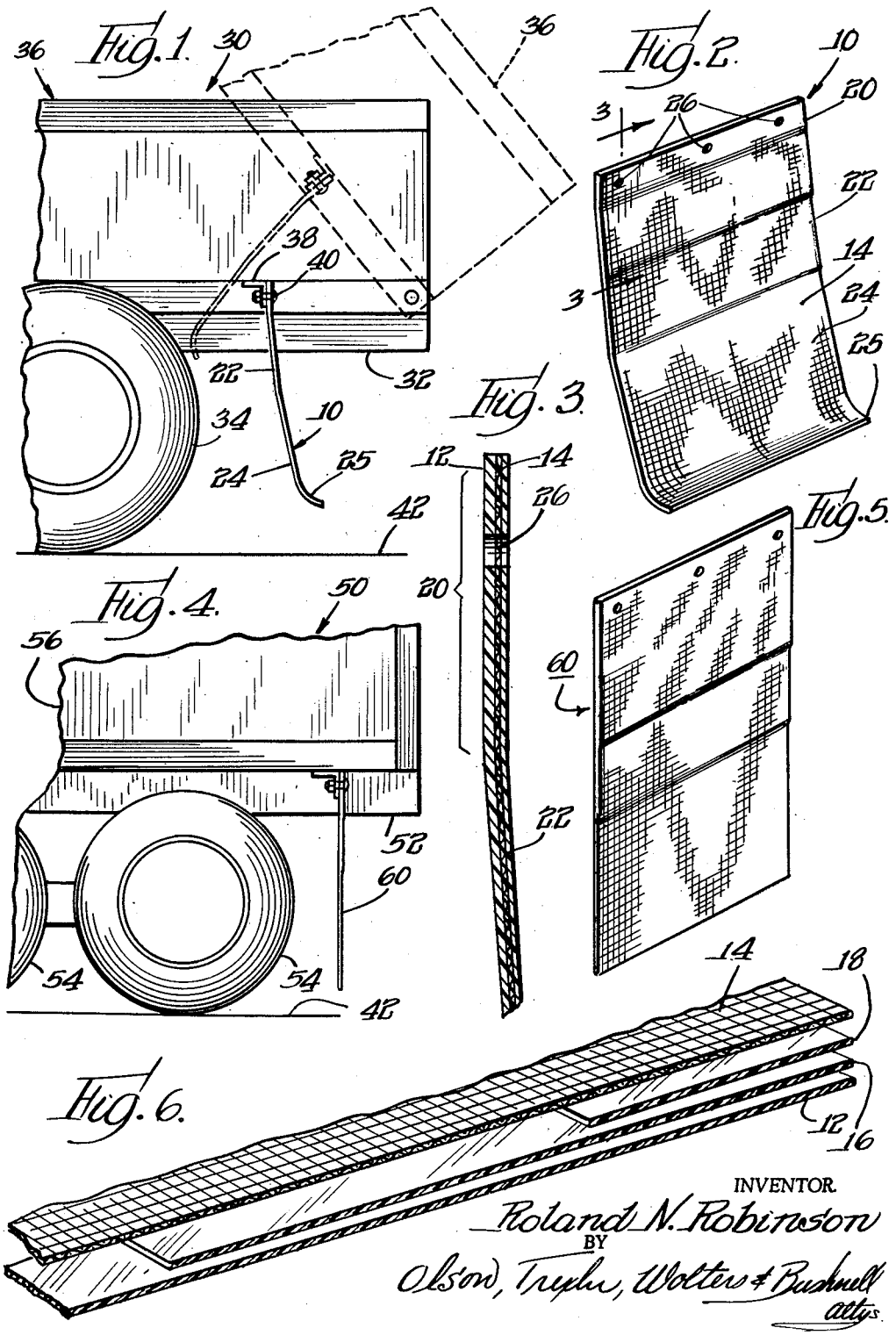

3,195,921
ONE-PIECE MUD GUARD
Roland N. Robinson, Rte. 2W, Onarga, Ill.
Filed Sept. 5, 1963, Ser. No. 306,883
6 Claims. (Cl. 280—154.5)

The present invention is concerned generally with safety appliances for road vehicles, and specifically relates to an improved mud or splash guard mountable behind the rear road-wheels of such road vehicles.

Virtually all states of the Union specify that multi-axle road vehicles such as dump trucks, semi-trailers and tractors therefor must carry mud flaps behind their rear road-wheels. These provisions are stringently enforced. In compliance with these requirements truck operators arrange on their vehicles flaps of sheet-like material which have in the past been composed of rubber or other flexible materials. It is not uncommon to see prior art mud flaps deflected by the wind stream when the vehicle is in motion over the road. In certain instances prior mud flaps extend rearwardly to such a degree that their effectiveness as deflector means is materially reduced. It is questionable that the existence of this condition is in the spirit of compliance with the several statutes directed to mud flaps, and accordingly certain truck fleet operators have taken steps to insure that mud flaps will not so behave. These steps have included mounting auxillary stays behind the mud flaps, such stays being secured to arms projecting laterally from the vehicle frame. Another scheme of reducing mud flap deflection has been to mount the flexible rubber flap to a lateral strut disposed a short distance above the road-wheels' center and behind the wheel. This permits the use of a short expanse of flexible material deducing to a like degree the expected deflection. However, the provision of the lateral struts entails added cost. As is obvious if these expedients could be eliminated substantial savings in equipment cost might be realized.

It is a general object of the invention to provide an improved splash guard when mounted on a road vehicle will resist deflection in the wind stream and maintain itself, without aid of auxillary supports, in shielding relationship to the adjacent road-wheels.

Another object of the invention is to provide an improved splash or mud guard of laminated construction fabricated from polyester resin-reinforced fibrous glass material wherein the selection, orientation and character of the laminae contribute to a long service life of the guard.

Still another object is to provide a splash guard mountable directly on the frame of a road vehicle to depend therefrom and terminate proximate the road surface.

Yet another object of the invention is to provide a splash guard mountable on the pivotally movable box of a dump truck or the like, the splash guard being arranged to closely confront the rear road-wheels when the vehicle is in condition for road travel, and to clear the road-wheels when the pivotable box is raised.

A further object of the invention is to provide an improved mud deflector formed of sheet material which is economical to manufacture, easy to install, efficient in deflector projectiles emanating from the road-wheels over a long service life.

Further objects of the invention pertain to the particular arrangement of the mud deflector whereby the above-outlined and additional operating features are attained.

The invention, both as to its organization and preferred mode of use, together with further objects and advantages, will best be understood by reference to the following specification taken in connection with the accompanying drawing in which like reference numerals designate like parts throughout, in which:

FIGURE 1 is a fragmentary, elevational view of the rear portion of a dump truck or the like having operatively mounted thereon a mud deflector of the present invention, there being shown in broken lines the disposition of the deflector when the truck is in position for dumping;

FIG. 2 is an enlarged perspective view of the mud deflector of FIG. 1;

FIG. 3 is a greatly enlarged fragmentary sectional view taken in the direction of the arrows along the line 3—3 of FIG. 2;

FIG. 4 is a fragmentary, elevational view of the rear portion of a straight-truck or of a semi-trailer or the like having operatively mounted thereon a mud deflector of a second form of the present invention;

FIG. 5 is an enlarged perspective view of the mud deflector of FIG. 4; and

FIG. 6 is a greatly enlarged, fragmentary exploded view showing the laminae of the mud deflector.

Referring now to the drawing, there is shown in FIG. 2 a mud deflector 10 of a first form of the invention, the deflector 10 being fabricated of polyester resin-reinforced layers of fibrous glass material affording great strength and durability. The deflector 10 is composed of a plurality of layers or laminae of glass fabric material, as shown in FIG. 6. Preferably, a first outer layer 12 is a fibrous glass mat composed of a random arrangement of fine glass fibers uniformly distributed to form a thin, porous, felt-like material. A mat material having a weight of two ounces per square foot has been found, when combined with the resin to be described below, to possess equal strength in all directions, to have good dimensional stability and to be relatively lower in cost than the available woven fabrics.

A second outer layer or lamina 14 is formed of a woven fabric of glass fibers. A preferred woven fabric has a weight of two ounces per square foot and has equal strength in both directions, i.e. woof and warp directions, to impart stiffness and rigidity to the deflector 10.

The outer laminae 12, 14 are continuous over the extent of the deflector 10 while therebetween in the upper portion of the deflector 10 are a plurality of filler laminae 16 and 18, two, for example, which are formed of a fiber glass mat product similar to the mat 12. The presence of laminae 16, 18 affords an added measure of strength and rigidity to the deflector 10. More particularly, the lamina 16 extends fully across the deflector 10 and downwardly to about one-half the length thereof. The lamina 18 is coextensive of the width of the deflector 10 and extends about one-third of the length of the deflector.

The several laminae 12–18 may be bonded to one another by a technique wherein no molding pressure is required as is well understood in the art (see 1952 Modern Plastics Encyclopedia and Engineer's Handbook, p. 176). More specifically, a length of the mat material composing layer 12 may be laid upon a molding surface complementary in shape to the deflector 10. After the layer 12 is properly disposed on the surface, properly catalyzed and accelerated polyester resin is sprayed on in sufficient quantities so that thorough impregnation will result. Thereafter, the layer 16, properly sized, is laid over the layer 12 and again polyester resin is sprayed on. Care is taken to squeeze out the air bubbles present between the layers. Thereafter, layers 18 and 14 may be applied in similar fashion, care being taken with the application of each layer to exclude air bubbles. Since the catalyzer is room-temperature acting, no added heat or ultra-violet light is required for gelation. After a suitable period of time has elapsed, the resin will properly gell, and finally harden producing with the layers 12–18 of glass a tough sheet-like structure.

Polyester resins and catalyzers used to accomplish this purpose are well known in the art. A suitable resin is manufactured by the American Cyanamid Co., Plastics and Resins Division of Wallingford, Connecticut, and sold under the trade designation "Laminac 4151." A suitable catalyst is manufactured by Wallace and Tiernan Inc., Lucidol Division of Buffalo, New York, and sold under the trade designation, "Lupersol DNF."

Referring now more particularly to FIG. 2 it will be seen that mud deflector 10 is generally rectangular in outline and includes an upper margin 20, an upper panel 22 and a lower panel 24. The upper margin 20 is equipped with a plurality of openings 26 for receiving fasteners to facilitate attachment of the deflector 10 to the associated road vehicle. The reinforcement laminae 16, 18 extend throughout the margin 26 as well as into the upper panel 22 thereby affording strength and stiffness to this portion of the deflector 10.

The upper panel 22 is angularly disposed with respect to the margin 20 at a small angle, three degrees being shown herein as an exemplary inclination. Thus when the margin 10 is secured to a vertical support as shown in FIG. 1, the panel 22 will slope away therefrom. The lower panel 24 is inclined with respect to the upper panel 22 and the margin 20 at a sharper angle to extend at a greater degree therefrom. The lower margin 25 of the panel 24 curves from the general plane of the panel 24 and terminates in an edge approaching a normal to the general plane of the panel 24, as shown in FIG. 2.

As above described, the outer lamina 12 is formed of fibrous glass mat material which during molding is laid directly against the molding surface which may be, for example, a smooth surface of steel, glass, slate, marble or the like. From this it follows that the outer surface of the lamina 12 will be substantially smooth and it is contemplated that such surface of the mud guard 10 shall confront the direction of travel of the road vehicle to which the guard 10 is secured. Conversely, the lamina 14 being of a woven material of glass fibers is somewhat rougher than the lamina 12 and it is contemplated that the surface 14 shall face opposite the direction of travel of the associated road vehicle.

In FIG. 1 there is shown a rear portion of a dump truck designated generally 30 and including a frame 32 supported by rear road-wheels 34 and having pivotally mounted thereon at dump-box 36. At the underside of the dump-box 36 there is disposed a laterally extending structural member 38 having a cross-sectional form of an angle iron. The structural member 38 is disposed somewhat rearwardly of road-wheels 34 and is expressly adapted while acting as a structural support for the box 36 to form a mounting provision for the mud deflector 10. Accordingly, the support element 38 is provided with a plurality of openings spaced complementary to the openings 26 for receiving fasteners 40 to mount the deflector 10 in operative relationship with respect to the road-wheels 36. In the mounted position, the mud deflector 10 presents its smooth surface of the lamina 12 towards the wheels 34 and the rough surface 14 rearwardly therefrom. As thus arranged it has been found that road deposits, moisture and the like, run freely off the smooth surface 12 and are not accumulated on the deflector 10.

To achieve its principal function of deflecting particles projected by the road-wheels 34 it is necessary that the mud deflector 10 be mounted closely adjacent the road-wheels 34, and to extend downwardly within a few inches of the road surface 42 when the dump truck 30 is in the normal, road-traveling conditions, as shown by full solid lines in FIG. 1.

Frequently, the dump truck 30 is driven while the pivotable box 36 is in a raised position, as shown by the broken lines in FIG. 1. In this condition the mud deflector 10 is raised along with the box 36. Being that the free end 25 of the lower panel 24 is curved rearwardly from the general plane of panel 24 and the major portion of the deflector 10 is inclined rearwardly from the wheels 34, the likelihood of the curved end portion 25 becoming entangled with the road-wheels 34 is materially reduced, as shown in FIG. 1.

A further advantage of the curved lower end portion of the panel 24 is that the free edge of the deflector 10 is arranged in a plane removed from the path of projectiles propelled rearwardly by the road-wheels 34. Thus, the likelihood of the deflector becoming broken through contact with flying projectiles is to a great degree reduced.

In FIG. 4 there is shown the rear portion of a straight-truck or road semi-trailer 50 having a frame 52 supported by road-wheels 54 and carrying a cargo container 56. Included in the frame 52 is a support element 58 which extends laterally of the frame 52. Mounted to the support member 58 is a mud deflector 60 of a second form of the present invention.

As shown in FIG. 5 the mud deflector 60 is generally rectangular in outline and is comprised of a plurality of polyester resin-reinforced laminae of arrangement similar to that of the mud deflector 10. The deflector 60 hangs straight vertically with respect to the support 58 terminating a short distance, eight inches for example, above a road surface 52. The presence of the reinforcing lamina in the upper portion of the deflector 60 serves to stiffen the deflector 10 to resist the forces from the wind stream of the vehicle 50. It has been found that the deflector 60 as described herein will maintain a substantially vertical shielding orientation with respect to the road-wheels 54 over a long service life in over-the-highway use of the vehicle 56.

While there has been described what is at present considered to be the preferred embodiment of the present invention, it will be understood that various modifications may be made therein, and it is intended to cover in the appended claims all such modifications as fall within the true scope and spirit of the invention.

What is claimed is:

1. A mud deflector for vertical mounting behind the rear road-wheels of a truck, semi-trailer, or the like comprising: a bonded laminous structure of polyester resin-reinforced fibrous glass material having a front surface for confronting such road-wheels and a rear surface opposite therefrom, said front surface being substantially smooth throughout and formed from a fibrous glass mat material so as to afford minimum resistance to the runoff of liquids, mud, or the like for obviating the buildup of road deposits thereon, said rear surface being formed from a woven fibrous glass material, said deflector including an upper, laterally extending margin having an opening therein to receive fastener means for attachment of said deflector in operative relationship with such road-wheels, and at least one reinforcing lamina of fibrous glass mat material arranged in the upper area of said mud deflector between said front and rear surfaces and extending through said upper margin to impart strength and stiffness thereto for resisting deformation of said deflector in the wind stream.

2. A mud deflector for vertical mounting behind the rear road-wheels of a truck, semi-trailer, or the like comprising: a bonded, laminous structure of polyester resin-reinforced fibrous glass material having a front surface for confronting such road-wheels and a rear surface opposite therefrom, said front surface being substantially smooth throughout and formed from a fibrous glass mat material so as to afford minimum resistance to the runoff of liquids, mud or the like for obviating the buildup of road deposits thereon, said rear surface being formed from a woven fibrous glass material, said deflector including an upper, laterally extending margin having an opening therein to receive fastener means for attachment of said deflector in operative relationship with such road-wheels, and reinforcing laminae arranged in the upper area of said mud deflector and extending through said upper margin to impart strength and stiffness thereto for resisting deformation of said deflector in the wind stream.

3. The mud deflector defined in claim 2 wherein said reinforcing laminae include a first lamina extending from said upper margin about one-half the length of said deflector and a second lamina extending from said margin about one-third the length of said deflector.

4. A mud deflector for vertical mounting behind the rear road-wheels of a truck, semi-trailer, or the like vehicle, comprising: a laminous structure of polyester resin-reinforced fibrous glass material having a front surface for confronting such road-wheels and a rear surface opposite therefrom, said mud deflector including an upper laterally extending margin having means to facilitate mounting said deflector in operative relationship with respect to such road-wheels, a lower panel of said deflector being angularly disposed with respect to said upper margin and carrying a portion of said front surface in an attitude sloping away from such road-wheels, said lower panel having a bottom margin shaped in a rearwardly extending stiffening conformation terminating in a plane removed from the path of projectiles propelled rearwardly by such road-wheels.

5. The mud deflector defined in claim 4 wherein said stiffening conformation comprises a laterally extending curved marginal portion curved rearwardly from said lower panel.

6. A mud deflector for vertical mounting behind the rear road-wheels of a truck, semi-trailer or the like vehicle, comprising: a laminous structure of polyester resin-reinforced fibrous glass materials having a front surface for confronting such road-wheels and a rear surface opposite therefrom, said mud deflector including an upper panel provided with an upper margin having means to facilitate mounting said deflector on such vehicle in operative relationship with respect to its road-wheels, said upper panel being inclined with respect to said margin so that when said margin is secured vertically to such vehicle, said upper panel slips away from such road-wheels, a lower panel of said deflector being inclined with respect to said upper panel in the same direction with respect to said margin, said lower panel having a bottom laterally extending margin curving rearwardly into a stiffening portion.

References Cited by the Examiner

UNITED STATES PATENTS 3,051,508 8/62 Federspiel _____ 280—154.5
3,116,072 12/63 Robb _____ 280—154.5

A. HARRY LEVY, *Primary Examiner.*

LEO FRIAGLIA, *Examiner.*